United States Patent
Shah et al.

(10) Patent No.: US 11,607,864 B2
(45) Date of Patent: Mar. 21, 2023

(54) LAMINATE FILM STRUCTURES HAVING BARRIER ADHESIVE LAYER

(71) Applicant: Dow Global Technologies LLC, Midland, MI (US)

(72) Inventors: Viraj K. Shah, Pearland, TX (US); Kalyan Sehanobish, Sanford, MI (US); Amira A. Marine, Missouri City, TX (US); Brian Dorvel, Pearland, TX (US); Harpreet Singh, Pearland, TX (US); Hayley A. Brown, Houston, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 337 days.

(21) Appl. No.: 16/643,246

(22) PCT Filed: Jul. 17, 2018

(86) PCT No.: PCT/US2018/042430
§ 371 (c)(1),
(2) Date: Feb. 28, 2020

(87) PCT Pub. No.: WO2019/060026
PCT Pub. Date: Mar. 28, 2019

(65) Prior Publication Data
US 2020/0254723 A1 Aug. 13, 2020

Related U.S. Application Data

(60) Provisional application No. 62/561,950, filed on Sep. 22, 2017.

(51) Int. Cl.
*B32B 7/12* (2006.01)
*C09J 7/29* (2018.01)
(Continued)

(52) U.S. Cl.
CPC ............. *B32B 7/12* (2013.01); *B32B 27/08* (2013.01); *B32B 27/302* (2013.01);
(Continued)

(58) Field of Classification Search
CPC ......... B32B 7/12; B32B 27/08; B32B 27/302; B32B 27/304; B32B 27/32; B32B 27/34;
(Continued)

(56) References Cited

U.S. PATENT DOCUMENTS

| 6,589,384 B2 | 7/2003 | Chen et al. |
| 9,676,976 B2 | 6/2017 | Takeda et al. |

(Continued)

FOREIGN PATENT DOCUMENTS

| JP | 2013091208 | 5/2013 |
| JP | 2013103434 | 5/2013 |

(Continued)

OTHER PUBLICATIONS

PCT/US2018/042430, International Search Report and Written Opinion dated Sep. 18, 2018.
(Continued)

*Primary Examiner* — Ellen S Hock (57) ABSTRACT

Laminate film structures including an adhesive layer having gas and moisture barrier properties are disclosed. The disclosed laminate film structures comprise films bonded together with an adhesive composition, the adhesive composition having barrier properties, e.g., controlling oxygen and/or water vapor transmission rates. The disclosed laminate film structures comprise films made from polymers and/or metallized polymers whereby the weight, thickness, and/or number of film layers has been reduced by using a barrier adhesive in place of a standard adhesive while still achieving similar barrier properties. Methods for forming laminate structures having a desired barrier performance are (Continued)

also disclosed, the methods comprising determining the desired barrier performance of the laminate structure, selecting a barrier adhesive, selecting two or more film layers, including at least a first film layer and a second film layer, applying the barrier adhesive on a surface of the first film layer, and bringing a surface of the second film layer into contact with the barrier adhesive applied on the surface of the first film layer, thereby forming the laminate structure having a desired barrier performance.

5 Claims, 2 Drawing Sheets (51) Int. Cl.
*C09J 7/38* (2018.01)
*B32B 27/08* (2006.01)
*B32B 27/30* (2006.01)
*B32B 27/32* (2006.01)
*B32B 27/34* (2006.01)
*B32B 27/36* (2006.01)
*B32B 37/12* (2006.01)

(52) U.S. Cl.
CPC ............ *B32B 27/304* (2013.01); *B32B 27/32* (2013.01); *B32B 27/34* (2013.01); *B32B 27/36* (2013.01); *B32B 37/12* (2013.01); *C09J 7/29* (2018.01); *C09J 7/38* (2018.01); *B32B 2307/7244* (2013.01); *B32B 2307/7246* (2013.01); *B32B 2439/70* (2013.01); *C09J 2423/046* (2013.01); *C09J 2423/106* (2013.01); *C09J 2425/006* (2013.01); *C09J 2427/006* (2013.01); *C09J 2467/006* (2013.01); *C09J 2475/00* (2013.01); *C09J 2477/006* (2013.01)

(58) Field of Classification Search
CPC ................... B32B 27/36; B32B 37/12; B32B 2307/7244; B32B 2307/7246; B32B 2439/70; C09J 7/29; C09J 7/38; C09J 2423/046; C09J 2423/106
See application file for complete search history.

(56) References Cited

U.S. PATENT DOCUMENTS

| 10,961,415 | B2 | 3/2021 | Vinci et al. |
| 2001/0013393 | A1 | 8/2001 | Chen et al. |
| 2013/0158186 | A1 | 6/2013 | Takeda et al. |
| 2016/0230046 | A1 | 8/2016 | Vinci et al. |

FOREIGN PATENT DOCUMENTS

| JP | 2013237154 | 11/2013 |
| JP | 05979417 | 8/2016 |

OTHER PUBLICATIONS

PCT/US2018/042430, International Preliminary Report on Patentability dated Mar. 24, 2020.

LAMINATE FILM STRUCTURES HAVING BARRIER ADHESIVE LAYER

REFERENCE TO RELATED APPLICATIONS

The present application claims the benefit of U.S. Provisional Application No. 62/561,950, filed on Sep. 22, 2017.

FIELD OF THE DISCLOSURE

The instant disclosure relates to laminate film structures including an adhesive layer having barrier properties. In particular, the disclosed laminate film structures comprise films bonded together by an adhesive layer, the adhesive layer having gas and/or moisture barrier properties, e.g., controlling oxygen and/or water vapor transmission rates. The disclosed laminate film structures comprise films made from polymers and/or metallized polymers whereby the weight, thickness, and/or number of film layers has been reduced by using a barrier adhesive composition in place of a standard adhesive composition, while still achieving similar barrier properties. The instant disclosure further relates to methods of forming laminate structures having a barrier adhesive layer, wherein the method enables reduction in weight, thickness, and/or number of film layers in the laminate structures relative to existing laminate structures while still achieving similar barrier properties.

BACKGROUND AND SUMMARY OF THE DISCLOSURE

Polymer materials, particularly films comprising polymer materials, are widely used for packaging purposes. These polymer materials find extensive application in the food and drug industries as well as in industrial and consumer applications. In these and other uses, exposure of the packaged product to oxygen (and/or other gases) and moisture may be highly undesirable. This is particularly the case where exposure to such gases and/or moisture results in degradation of the packaged product over time. Unfortunately, many polymeric films are inherently relatively permeable to gases and/or moisture. One approach to enhancing barrier properties that has been investigated has been to use multiple layers of polymeric materials, with the layers bonded together with an adhesive to form laminates. In some instances, the polymer material layers and/or the adhesives are selected for their barrier properties.

Recently, long-term storage of foodstuffs has demanded higher levels of functionality for multilayer films, and gas barrier properties that prevent the penetration of external oxygen in order to inhibit oxidation, carbon dioxide-barrier properties, and barrier properties relative to various odor components are now being demanded. When imparting barrier functions to a multilayer film, the polyolefin films typically used as the inner layer (on the sealant side) exhibit poor gas barrier properties, and imparting these films with barrier functions by coating or vapor deposition is difficult. As a result, the various films used for the outer layer (including polyester resins such as polyethylene terephthalate (hereafter abbreviated as "PET"), polyamide resins, and stretched polyolefin resins) are often imparted with barrier functions.

In some instances, the film layer itself is imparted with barrier functions. In cases where coating is used to impart these outer layer films with barrier functions, one example of a widely used barrier coating material is vinylidene chloride, which exhibits superior oxygen-barrier properties and water vapor-barrier properties. However, there are problems associated with the use of vinylidene chloride, including the generation of dioxin when the material is incinerated during disposal. Further, polyvinyl alcohol resins and ethylene-polyvinyl alcohol copolymers have also been used as barrier coating materials, but although these materials exhibit favorable oxygen-barrier properties under low humidity, they suffer from poor oxygen-barrier properties under high humidity, are vulnerable to pinhole formation, thereby deteriorating barrier performance, and exhibit inferior boiling resistance and retort resistance. On the other hand, films having a vapor deposited layer of a metal such as aluminum provided as a gas barrier layer are opaque, meaning the internal contents cannot be viewed, and are also unable to be used in microwave ovens. Moreover, films having a vapor deposited layer of a metal oxide such as silica or alumina provided as a gas barrier layer are expensive, and suffer from poor flexibility, resulting in a large variation in the gas barrier properties due to cracking and pinholes.

Furthermore, existing solutions for adding barrier functionality to laminate structures generally involve increasing the complexity of the structures (e.g., more layers with particular barrier functionality) and/or increasing the weight of the laminate structures by increasing the thickness of the film layers to provide better barrier functionality. Increasing the complexity of these structures, either in number of layers or thickness of layers, results in increased manufacturing costs.

It would thus be desirable to have laminate film structures including film layers made from polymers and/or metallized polymers whereby the weight, thickness, and/or number of film layers has been reduced compared to existing laminate structures while still achieving similar barrier properties.

Laminate film structures having a barrier adhesive layer are disclosed herein. The disclosed laminate film structures are suitable for use in, for example, flexible packaging applications. The disclosed laminate film structures comprise polymer and/or metallized polymer film layers bonded together by a barrier adhesive layer, whereby the weight, thickness, and/or number of film layers has been reduced, replaced, or removed by inclusion of the barrier adhesive layer in the laminate film structure. In some embodiments, the disclosed laminate film structures are recyclable. The disclosed laminate film structures can achieve desired barrier properties, e.g., controlling gas and/or moisture transmission rates, equal to or better than incumbent laminate film structures using standard adhesives. However, the disclosed laminate film structures are beneficial in that they reduce the cost and/or number of process steps required to produce the incumbent structures.

In some embodiments, the laminate film structures comprise a film layer and a barrier adhesive layer disposed on a surface of the film layer. In some embodiments, the film layer is selected from the group consisting of polyethylene, polypropylene, polyethylene terephthalate, polyamide, polystyrene, ethylene vinyl alcohol, polyvinyl dichloride, cycloolefin copolymer, polyvinyl chloride, polymonochlorotrifluoroethylene, polyvinyl alcohol, sytren butadiene, and the like. In some embodiments, the barrier adhesive layer can comprise a solvent-based adhesive, a water-based adhesive, and/or a solventless adhesive. In some embodiments, the disclosed laminate film structures include a film layer and a barrier adhesive layer disposed on a surface of the film layer, wherein the laminate film structure has an oxygen transmission rate not greater than 20 $ccO_2/m^2$/day, measured according to ASTM Method D3985. In some embodiments, the disclosed laminate film structures include a film layer and a barrier adhesive layer disposed on a surface of the film layer, wherein the laminate film structure has a water vapor transmission rate not greater than 5 $gmH_2O/m^2/day$, measured according to ASTM Method F1249.

Methods for forming laminate structures having a desired barrier performance are also disclosed. In some embodiments, the methods comprise determining the desired barrier performance of the laminate structure, selecting a barrier adhesive, selecting two or more film layers, including at least a first film layer and a second film layer, applying the barrier adhesive on a surface of the first film layer, and bringing a surface of the second film layer into contact with the barrier adhesive applied on the surface of the first film layer, thereby forming the laminate structure having a desired barrier performance.

Articles comprising the disclosed laminate film structures are also disclosed. In some embodiments, the disclosed articles include, e.g., flexible packages, pouches, stand-up pouches, bags, etc.

BRIEF DESCRIPTION OF THE DRAWINGS

Reference is made to the accompanying drawings in which.

DETAILED DESCRIPTION OF THE DISCLOSURE

In some embodiments, the disclosed laminate film structures comprise a film layer made from a polymer or a metallized polymer and a barrier adhesive layer disposed on a surface of the film layer. In some embodiments, laminate film structures are disclosed comprising a first film layer, a second film layer, and a barrier adhesive layer disposed intermediate the first film layer and the second film layer.

In some embodiments, the film layer is selected from the group consisting of polyethylene, polypropylene, polyethylene terephthalate, nylon, polystyrene, and polyvinyl dichloride. In some embodiments, the barrier adhesive layer comprises a solvent-based adhesive, a water-based adhesive, and/or or a solventless adhesive.

In some embodiments, the laminate film structures have an oxygen transmission rate not greater than 20 $ccO_2/m^2/day$, measured according to ASTM Method D3985. In some embodiments, the laminate film structures have a water vapor transmission rate not greater than 5 $gmH_2O/m^2/day$, measured according to ASTM Method F1249.

In some embodiments, the barrier adhesive comprises an isocyanate component and an isocyanate-reactive component. In some embodiments, the isocyanate component comprises a single species of polyisocyanate. In some embodiments, the polyisocyanate is an aliphatic polyisocyanate. In some embodiments, the polyisocyanate is selected from polymeric hexamethylene diisocyanate (HDI trimer isocyanurate), methylene diphenyl diisocyanate, dicyclohexylmethane 4,4'-diisocyanate, and toluene diisocyanate. In some embodiments, the isocyanate-reactive component comprising a hydroxyl-terminated polyester incorporated as substantially-miscible solids in a carrier solvent, the polyester formed from a single species of a linear aliphatic diol having terminal hydroxyl groups and from 2 to 10 carbon atoms, and a linear dicarboxylic acid, the polyester having a number average molecular weight from 300 to 5,000 and being solid at 25° C., and having a melting point of 80° C. or below. In some embodiments, the carrier solvent is selected from ethyl acetate, methyl ethyl ketone, dioxolane, acetone, and combinations thereof. In some embodiments, the hydroxyl-terminated polyester is formed from a $C_3$ to $C_6$ diol and a dicarboxylic acid selected from adipic acid, azelaic acid, sebacic acid, and combinations thereof. In some embodiments, the isocyanate-reactive component further includes an acrylate viscosity modifier. In some embodiments, the weight ratio of the isocyanate component to the isocyanate-reactive component in the barrier adhesive is from 1:1 to 2:1.

In some embodiments, another film layer made from a polymer or a metallized polymer is brought into contact with the film layer having the barrier adhesive layer disposed thereon, thereby creating a laminate film structure. The laminated films can be multilayer or monolayer. In each embodiment of the disclosure, the disclosed laminate film structures have reduced weight, thickness, and/or number of film layers compared to incumbent laminate structures while still achieving similar barrier properties. There is a reduction in the permeability of oxygen and/or moisture through the laminate structures by using the barrier adhesive layer in place of standard adhesives. To better understand the potential use of barrier adhesive, the permeability of the barrier adhesive being used is evaluated by preparing samples which are tested to generate performance data. The permeability of the barrier adhesive is derived from the data, and a model is created to enable design of various film structures to harness the potential cost reduction, layer reduction, simplification of structures, or sustainability via downgauging using barrier adhesive in place of standard adhesive.

Before creating the model, which is then used to predict laminate structure performance with and without barrier adhesive, the barrier performance of the barrier adhesive must first be quantified. To generate the data to support the model, several samples are prepared and tested using a barrier adhesive composed of 25 to 35 wt % crystallizable polyester resin, 0.25% Defoamer 7R10 (acrylic copolymer with ethyl acetate), and 64.75 wt % urethane grade ethyl acetate. The polyester is cured with an aliphatic isocyanate co-reactant.

The samples are fabricated into laminates using a LABO COMBI™ 400 laminator or a SUPER COMBI™ 3000 laminator, depending on the sample and as indicated in Table 1 and Table 2 below. The barrier adhesive is coated on a film via gravure cylinder. In Table 1 and Table 2, the coated film is the first film listed for a particular structure. For the gravure cylinder, a 130 quad with 15 BCM is used. The adhesive is applied at a coating weight of about 3 g/m². For runs on the LABO COMBI™ 400 laminator, the films are then passed through a three-zoned oven with temperatures set at 90° C. first zone, 100° C. second zone, and 110° C. third zone. For runs on the SUPER COMBI™ 3000 laminator, the films are then passed through a two-zoned oven with temperatures set at 80° C. first zone and 100° C. second zone. The coated film is then nipped to another film under a heated steel roll with a temperature of 90° C., and the nip pressure set to 40 psi. The laminated structure passes a final chill roll of a temperature of 17° C. The laminates are then placed in a temperature controlled room to cure at 23° C., 50% Relative Humidity for 7 days.

The oxygen transmission rates of the sample laminate structures are tested according to the methods outlined in ASTM Method D3985 (Standard Test Method for Oxygen Gas Transmission Rate through a Plastic Film and Sheeting Using a Coulometric Sensor). The water vapor transmission rates of the laminated structures are tested according to methods outlined in ASTM Method F1249.

From the permeability data for the sample laminate structures, the permeability of the barrier adhesive itself can be determined. Transmission rates of vapor through a solid barrier ("TR") can be described as a function of the permeability ("P") (solubility of the vapor in the solid and the diffusivity of the vapor as it is transported through the medium) and the path length of the solid material or thickness ("L"). For a multilayered solid with materials of different thickness ($L_1$, $L_2$, etc.) and permeability ($P_1$, $P_2$, etc.), the total vapor transmission rate $TR_{total}$ can be described as follows:

$$\frac{1}{TR_{total}} = \sum_{i=1}^{} \frac{L_i}{P_i}$$

Experimental data on $TR_{total}$ for oxygen and water vapor is used with a series of experimentally produced laminated multilayer structures to determine the average permeability as a function of thickness of the disclosed and comparative adhesive compositions, as detailed in Table 1 and Table 2.

TABLE 1

OTR Performance of Sample Laminate Structures

OTR Analysis

| Property | Oxygen Transmission | |
|---|---|---|
| Units | cm³/m²/day | |
| Conditions | 23° C. 85% RH | |
| Data Sources: | Structure Assistant ™ | |
| Barrier Adhesive OTR Estimate: | 1.37 | cm³-mil/m2/day |

| | Measured Properties | |
|---|---|---|
| Structure | Standard Adhesive[3] | Barrier Adhesive |
| 20μ BOPP/20μ MET BOPP[1] | 14.90 | 7.15 |
| 20μ BOPP/20μ MET BOPP/ 50μ PE[1] | 14.83 | 4.70 |

TABLE 1-continued

OTR Performance of Sample Laminate Structures

| 20μ BOPP/70μ PE[1] | 1158.29 | 13.59 |
|---|---|---|
| 20μ BOPP/20μ BOPP[1] | 1076.00 | 13.57 |
| 12μ PET/80μ PE[1] | 84.60 | 11.83 |
| 12μ PET/60μ EVOH (85% RH)[2] | 1.60 | 1.40 |

[1]Samples prepared on LABO COMBI ™ 400 laminator.
[2]Samples prepared on SUPER COMBI ™ 3000 laminator.
[3]Standard Adhesive is ADCOTE ™ 577/577B.

TABLE 2

OTR Performance of Sample Laminate Structures

WVTR Analysis

| Property | Water Vapor Transmission | |
|---|---|---|
| Units | gm/m²/day | |
| Conditions | 38° C. 90% RH | |
| Data Sources: | Structure Assistant ™ | |
| Barrier Adhesive WVTR Estimate: | 1.2 | gm-mil/m2/day |

| | Measured Properties | |
|---|---|---|
| Structure | Standard Adhesive[3] | Barrier Adhesive |
| 20μ BOPP/20μ MET BOPP[1] | 0.15 | 0.15 |
| 20μ BOPP/20μ MET BOPP/ 50μ PE[1] | 0.14 | 0.14 |
| 20μ BOPP/70μ PE[1] | 2.80 | 2.28 |
| 20μ BOPP/20μ BOPP[1] | 3.15 | 2.50 |
| 12μ PET/80μ PE[1] | 4.00 | 3.00 |
| 12μ PET/60μ EVOH[2] | 23.44 | 6.32 |

[1]Samples prepared on LABO COMBI ™ 400 laminator.
[2]Samples prepared on SUPER COMBI ™ 3000 laminator.
[3]Standard Adhesive is ADCOTE ™ 577/577B From the samples analyzed, and as indicated in Table 1 and Table 2, it is estimated that the barrier adhesive has an oxygen transmission rate of 1.37 ccO₂/m²/day and a water vapor transmission rate of 1.20 gmH₂O/m²/day. This particular barrier adhesive is used in the model discussed herein to predict performance for various laminate structures. However, other barrier adhesives can be used according to this disclosure after determining oxygen transmission rate and water vapor transmission rate.

Using the estimated oxygen transmission rate and water vapor transmission rate of the barrier adhesive together with the known permeability values for various plastic films as indicated in Table 3 and Table 4, laminate films structures are modeled, including those schematically represented in FIGS. 1 to 6.

TABLE 3

OTR Value for Packaging Films

| | OTR @ 73° F. (23° C.), 0% RH | |
|---|---|---|
| Film Type | cm³/100 in2/24 hr) | (cm³/m2/24 hr) |
| The following OTRs are bulk material properties displayed at 1 mil. You may divide by the gauge (in mil) in order to approximate OTR at a different thickness. | | |
| EVOH* (ethylene vinyl alcohol | .005-.12 | .08-.19 |
| Biax Nylon-6 | 1.2-2.5 | 18.6-39 |
| OPET (oriented polyester) | 2-6 | 31-93 |
| OPP | 100-160 | 1550-2500 |

TABLE 3-continued

OTR Value for Packaging Films

| Film Type | OTR @ 73° F. (23° C.), 0% RH | |
|---|---|---|
| | cm³/100 in2/24 hr | (cm³/m2/24 hr) |
| Cast PP | 150-200 | 2300-3100 |
| HDPE (high density polyethylene) | 150-200 | 2300-3100 |
| OPS (oriented polystyrene) | 280-400 | 4350-6200 |
| LDPE (low desnity polyethylene) | 450-500 | 7000-8500 |
| The following OTRs are enhanced by coating or metallizing. Therefore, these are not bulk film properties, and total film thickness has little impact on the OTR value. | | |
| Metallized OPET | .01-11 | .16-1.7 |
| PVOH-coated OPP (AOH) | .02 | .31 |
| Metallized biax Nylon-6 | .05 | .78 |
| PVdC-coated OPET | .30-50 | 4.7-7.8 |
| High Barrier PVdC-coated OPP | .30-.60 | 4.7-9.3 |
| PVdC-coated biax Nylon-6 | .35-.50 | 4.7-7.8 |
| Metallized OPP | 1.2-10 | 19-160 |
| Sealable PVdC-coated OPP | 1.5-3.5 | 23-54 |

TABLE 4

WVTR Value for Packaging Films

| Film Type | WVTR @ 100° F. (38° C.), 90% RH for 1 mil film | |
|---|---|---|
| | (g/100 in2/24 hr) | (g/m2/24 hr) |
| Biax OPP | 0.25-0.40 | 3.9-6.2 |
| HDPE ( high density polyethylene) | 0.3-0.5 | 4.7-7.8 |
| Cast PP | 0.6-0.7 | 9.3-11 |
| Biax PET (oriented polyester) | 1.0-1.3 | 16-20 |
| LDPE (low density polyethylene) | 1.0-1.5 | 16-23 |
| EVOH* (Ethylene vinyl alcohol) | 1.4-8.0 | 22-124 |
| Biax Nylon (BON) | 10-13 | 155-202 |

Figure 1:
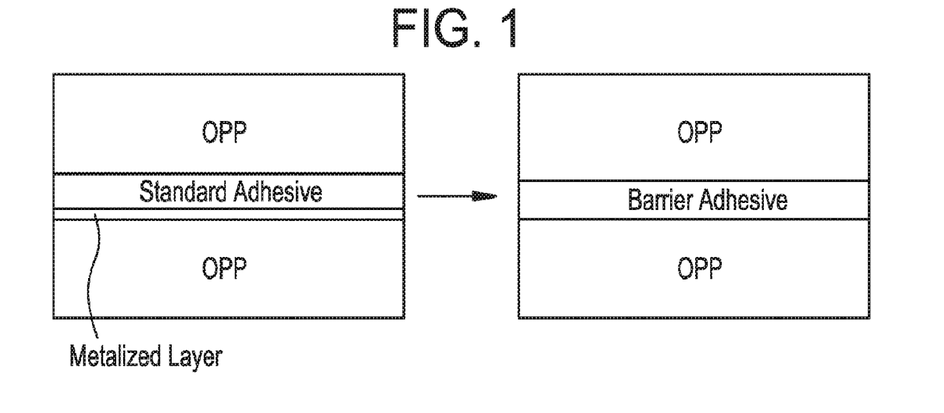
FIG. 1 illustrates a schematic representation of an incumbent BOPP//metallized-BOPP laminate film structure and a new BOPP/BOPP laminate film structure with barrier adhesive, the incumbent and new film structures having similar barrier properties.

For instance, FIG. 1 illustrates a schematic representation of an incumbent BOPP//met-BOPP laminate film structure and a new BOPP/BOPP laminate film structure with barrier adhesive. The incumbent BOPP//met-BOPP laminate film structure includes a 20 μm BOPP film laminated to a 20 μm metallized BOPP film using a standard adhesive and has a calculated oxygen transmission rate of 14.9 ccO₂/m²/day. The new BOPP/BOPP laminate film structure with barrier adhesive includes a 20 μm BOPP film laminated to another 20 μm BOPP film using a barrier adhesive and has a calculated oxygen transmission rate of 13.6 ccO₂/m²/day. As is apparent from FIG. 1 and the calculated oxygen transmission rates, the metallized BOPP layer can be completely removed from the laminate structure while still achieving the same oxygen barrier performance. The incumbent and new films are suitable for the same end uses (e.g., packaging applications).

Figure 2:
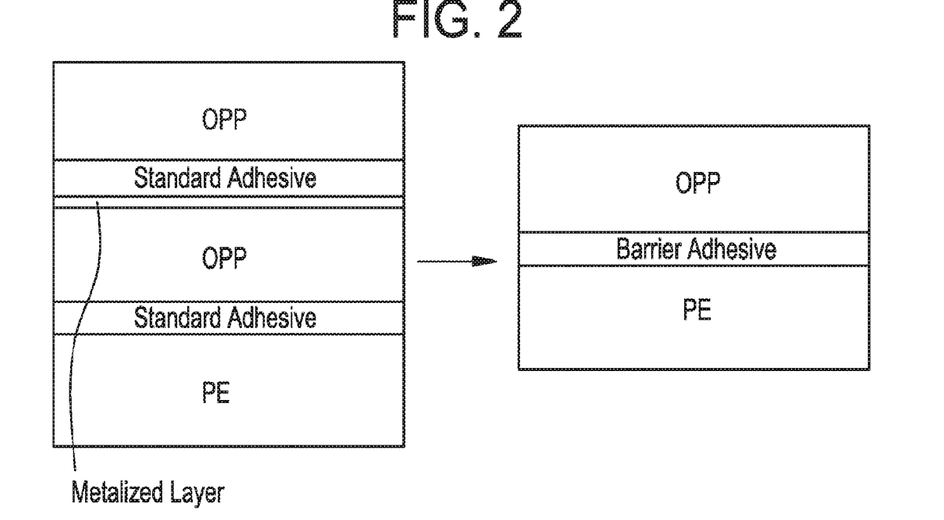
FIG. 2 illustrates a schematic representation of an incumbent BOPP//metallized BOPP//PE laminate film structure and a new BOPP//PE laminate film structure with barrier adhesive, the incumbent and new film structures having similar barrier properties.

FIG. 2 illustrates a schematic representation of an incumbent BOPP//met-BOPP//PE laminate film structure and a new BOPP//PE laminate film structure with barrier adhesive. The incumbent BOPP//met-BOPP//PE laminate film structure includes a 20 μm BOPP film laminated to a 20 μm metallized BOPP film using a standard adhesive and further a 50 μm PE film laminated to the metallized BOPP film using additional standard adhesive. The incumbent BOPP//met-BOPP//PE laminate film structure has a calculated oxygen transmission rate of 14.8 ccO₂/m²/day. The new BOPP//PE laminate film structure with barrier adhesive includes a 20 μm BOPP film laminated to a 50 μm PE film using a barrier adhesive and has a calculated oxygen transmission rate of 13.6 ccO₂/m²/day. As is apparent from FIG. 2 and the calculated oxygen transmission rates, the metallized BOPP layer can be completely removed from the laminate structure while still achieving the same oxygen barrier performance. The incumbent and new films are suitable for the same end uses (e.g., packaging applications).

Figure 3:
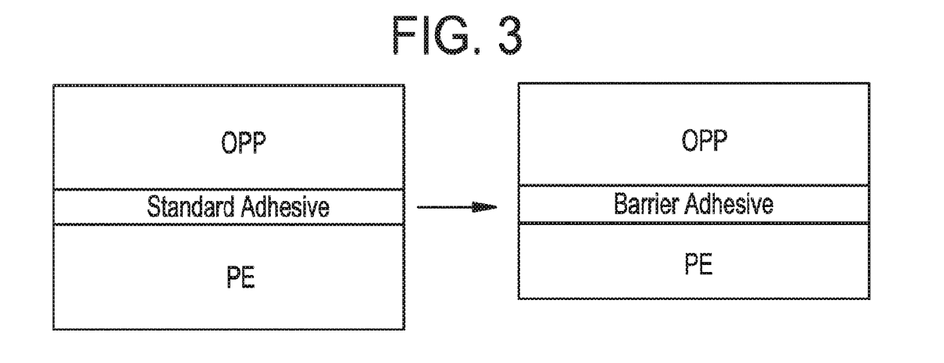
FIG. 3 illustrates a schematic representation of an incumbent BOPP//PE laminate film structure and a new BOPP//PE laminate film structure with barrier adhesive, the incumbent and new film structures having similar barrier properties.

FIG. 3 illustrates a schematic representation of an incumbent BOPP//PE laminate film structure and a new BOPP//PE laminate film structure with barrier adhesive. The incumbent BOPP//PE laminate film structure includes a 20 μm BOPP film laminated to a 70 μm PE film using a standard adhesive and has a calculated water vapor transmission rate of 2.80 gmH₂O/m²/day. The new BOPP//PE laminate film structure with barrier adhesive includes a 20 μm BOPP film laminated to a 40 μm PE film using a barrier adhesive and has a calculated water vapor transmission rate of 2.82 gmH₂O/m²/day. As is apparent from FIG. 3 and the calculated water vapor transmission rates, the thickness of the PE film can be significantly downgraded while still achieving the same moisture barrier performance. The incumbent and new films are suitable for the same end uses (e.g., packaging applications).

Figure 4:
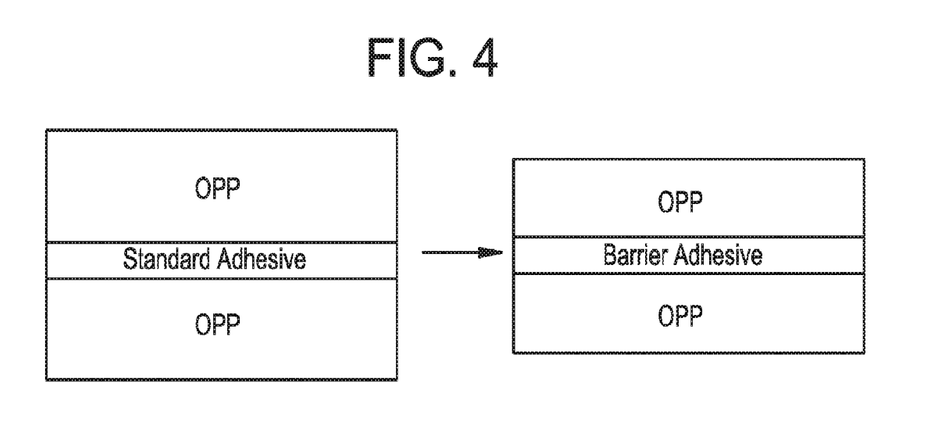
FIG. 4 illustrates a schematic representation of an incumbent BOPP//BOPP laminate film structure and a new BOPP//BOPP laminate film structure with barrier adhesive, the incumbent and new film structures having similar barrier properties.

FIG. 4 illustrates a schematic representation of an incumbent BOPP//BOPP laminate film structure and a new BOPP//BOPP laminate film structure with barrier adhesive. The incumbent BOPP//BOPP laminate film structure includes a 20 μm BOPP film laminated to a 20 μm BOPP film using a standard adhesive and has a calculated water vapor transmission rate of 3.15 gmH₂O/m²/day. The new BOPP//BOPP laminate film structure with barrier adhesive includes a 15 μm BOPP film laminated to a 15 μm BOPP film using a barrier adhesive and has a calculated water vapor transmission rate of 3.12 gmH₂O/m²/day. As is apparent from FIG. 4 and the calculated water vapor transmission rates, the thickness of the BOPP film can be significantly downgraded while still achieving the same moisture barrier performance. The incumbent and new films are suitable for the same end uses (e.g., packaging applications).

Figure 5:
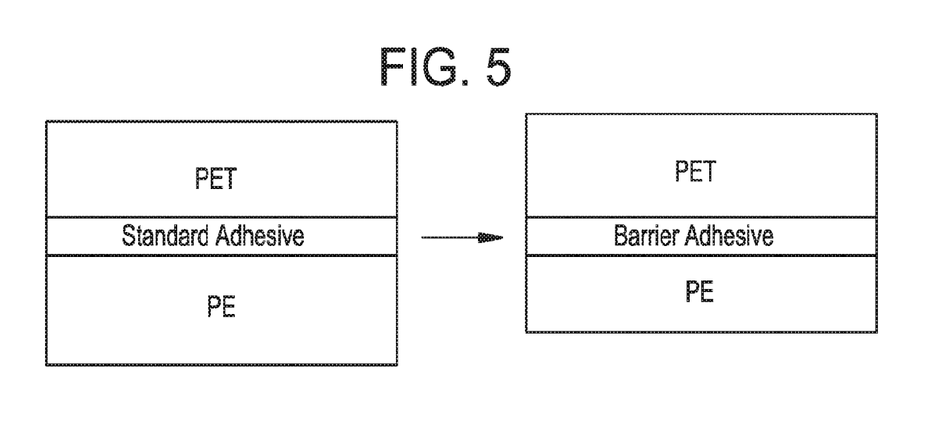
FIG. 5 illustrates a schematic representation of an incumbent PET//PE laminate film structure and a new PET//PE laminate film structure with barrier adhesive, the incumbent and new film structures having similar barrier properties.

FIG. 5 illustrates a schematic representation of an incumbent PET//PE laminate film structure and a new PET//PE laminate film structure with barrier adhesive. The incumbent PET//PE laminate film structure includes a 12 μm PET film laminated to a 80 μm PE film using a standard adhesive and has a calculated water vapor transmission rate of 4 gmH₂O/m²/day. The new PET//PE laminate film structure with barrier adhesive includes a 12 μm PET film laminated to a 50 μm PE film using a barrier adhesive and has a calculated water vapor transmission rate of 4 gmH₂O/m²/day. As is apparent from FIG. 5 and the calculated water vapor transmission rates, the thickness of the PE film can be significantly downgraded while still achieving the same moisture barrier performance. The incumbent and new films are suitable for the same end uses (e.g., packaging applications).

Figure 6:
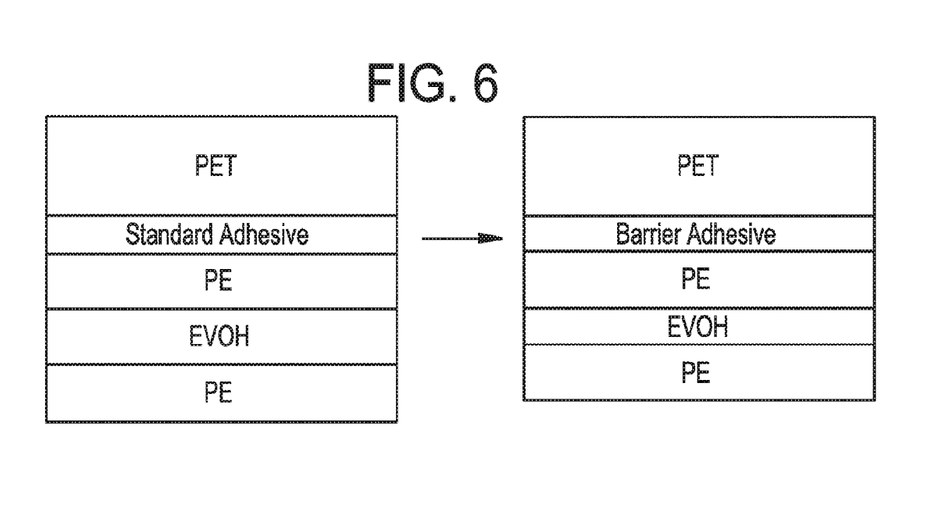
FIG. 6 illustrates a schematic representation of an incumbent PET//PE/EVOH/PE laminate film structure and a new PET//PE/EVOH/PE laminate film structure with barrier adhesive, the incumbent and new film structures having similar barrier properties.

FIG. 6 illustrates a schematic representation of an incumbent PET//PE/EVOH/PE laminate film structure and a new PET//PE/EVOH/PE laminate film structure with barrier adhesive. The incumbent PET//PE/EVOH/PE laminate film structure includes a 12 μm PET film laminated to a 60 μm EVOH film using a standard adhesive. The incumbent PET//PE/EVOH/PE laminate film structure has a calculated oxygen transmission rate of 1.60 ccO₂/m²/day. The new PET//PE/EVOH/PE laminate film structure with barrier adhesive includes a 12 μm PET film laminated to a 50 μm EVOH film using a barrier adhesive and has a calculated oxygen transmission rate of 1.63 ccO₂/m²/day. As is apparent from FIG. 6 and the calculated oxygen transmission rates, the EVOH film can be significantly downgraded while still achieving the same oxygen barrier performance. The incumbent and new films are suitable for the same end uses (e.g., packaging applications).

The measured or calculated performance OTR and WVTR for each of the laminate film structures in FIGS. 1 to 6 is summarized in Table 5 and Table 6 below. The first row under each Figure row below represents measured properties and the second row under each Figure row represents calculated properties. For instance using the FIG. 1 row, the 20μ BOPP/20μ MET BOPP structure row identifies measured properties while the 20μ BOPP/20μ BOPP structure row represents calculated properties.

TABLE 5

Summary of Measured and Calculated OTRs ($cm^3O_2/m^2/day$) for FIGS. 1 to 6

| Structure | Standard Adhesive | Barrier Adhesive |
| --- | --- | --- |
| FIG. 1 | | |
| 20μ BOPP/20μ MET BOPP | 14.90 | 7.15 |
| 20μ BOPP/20μ BOPP | 1076.00 | 13.57 |
| FIG. 2 | | |
| 20μ BOPP/20μ MET BOPP/50μ PE | 14.83 | 4.70 |
| 20μ BOPP/50μ PE | 1332.46 | 13.61 |
| FIG. 3 | | |
| 20μ BOPP/70μ PE | 1158.29 | 13.59 |
| 20μ BOPP/40μ PE | 1440.86 | 13.62 |
| FIG. 4 | | |
| 20μ BOPP/20μ BOPP | 1076.00 | 13.57 |
| 15μ BOPP/15μ BOPP | 1431.00 | 13.62 |
| FIG. 5 | | |
| 12μ PET/80μ PE | 84.60 | 11.83 |
| 12μ PET/50μ PE | 85.90 | 11.85 |
| FIG. 6 | | |
| 12μ PET/60μ EVOH (85% RH) | 1.60 | 1.40 |
| 12μ PET/50μ EVOH (85% RH) | 1.95 | 1.63 |

TABLE 6

Summary of Measured and Calculated WVTRs ($gmH_2O/m^2$) for FIGS. 1 to 6

| Structure | Standard Adhesive | Barrier Adhesive |
| --- | --- | --- |
| FIG. 1 | | |
| 20μ BOPP/20μ MET BOPP | 0.15 | 0.15 |
| 20μ BOPP/20μ BOPP | 3.15 | 2.50 |
| FIG. 2 | | |
| 20μ BOPP/20μ MET BOPP/50μ PE | 0.14 | 0.14 |
| 20μ BOPP/50μ PE | 3.33 | 2.61 |
| FIG. 3 | | |
| 20μ BOPP/70μ PE | 2.80 | 2.28 |
| 20μ BOPP/40μ PE | 3.67 | 2.82 |
| FIG. 4 | | |
| 20μ BOPP/20μ BOPP | 3.15 | 2.50 |
| 15μ BOPP/15μ BOPP | 4.20 | 3.12 |
| FIG. 5 | | |
| 12μ PET/80μ PE | 4.00 | 3.00 |
| 12μ PET/50μ PE | 6.05 | 4.00 |
| FIG. 6 | | |
| 12μ PET/60μ EVOH (85% RH) | 23.44 | 6.32 |
| 12μ PET/50μ EVOH (85% RH) | 25.25 | 6.44 |

The structures tested and modeled, i.e., those shown in FIGS. 1 to 6, are not the only film structures and polymers which can be modified or replaced according to this disclosure. The barrier performance of the barrier adhesive makes it suitable for downgauging or replacing other materials in laminate structures such as nylon, oriented polystyrene, and/or polyvinyl dichloride ("PVDC"), among other materials. By determining the desired barrier performance of a laminate film structure, selecting a barrier adhesive with a known/determinable permeability, and identifying the permeability of films to be used in the laminate film structure, a film structure can be prepared which achieves similar barrier performance to existing films while reducing the number of films in the structure and/or the thickness of films in the structure.

Articles comprising the disclosed laminate film structure are also disclosed. In some embodiments, the articles include flexible packaging and stand-up pouches.

In addition to the embodiments described above, many embodiments of specific combinations are within the scope of the disclosure, some of which are described below:

Embodiment 1. A laminate film structure suitable for use in a flexible packaging, comprising:
 a film layer; and
 a barrier adhesive layer disposed on a surface of the film layer,
 wherein the laminate film structure has an oxygen transmission rate not greater than 20 $ccO_2/m^2$/day, measured according to ASTM Method D3985.

Embodiment 2. A laminate film structure suitable for use in a flexible packaging, comprising:
 a film layer; and
 a barrier adhesive layer disposed on a surface of the film layer,
 wherein the laminate film structure has a water vapor transmission rate not greater than 5 $gmH_2O/m^2$/day, measured according to ASTM Method F1249.

Embodiment 3. A laminate film structure suitable for use in a flexible packaging, comprising:
 a first film layer;
 a second film layer; and
 a barrier adhesive layer disposed intermediate the first film layer and the second film layer,
 wherein the laminate film structure has an oxygen transmission rate not greater than 20 $ccO_2/m^2$/day, measured according to ASTM Method D3985.

Embodiment 4. A laminate film structure suitable for use in a flexible packaging, comprising:
 a first film layer;
 a second film layer; and
 a barrier adhesive layer disposed intermediate the first film layer and the second film layer,
 wherein the laminate film structure has an oxygen transmission rate not greater than 20 5 $gmH_2O/m^2$/day, measured according to ASTM Method D3985.

Embodiment 5. The laminate film structure according to any preceding or succeeding Embodiment, wherein the barrier adhesive layer comprises a solvent-based adhesive.

Embodiment 6. The laminate film structure according to any preceding or succeeding Embodiment, wherein the barrier adhesive layer comprises a water-based adhesive.

Embodiment 7. The laminate film structure according to any preceding or succeeding Embodiment, wherein the barrier adhesive layer comprises a solventless adhesive.

Embodiment 8. The laminate film structure according to any preceding or succeeding Embodiment, wherein the first film layer comprises a polymer selected from the group consisting of polyethylene, polypropylene, polyethylene terephthalate, nylon, polystyrene, and polyvinyl dichloride.

Embodiment 9. The laminate film structure according to any preceding or succeeding Embodiment, wherein the second film layer comprises a polymer selected from the group consisting of polyethylene, polypropylene, polyethylene terephthalate, nylon, polystyrene, and polyvinyl dichloride.

Embodiment 10. The laminate film structure according to any preceding or succeeding Embodiment, wherein the first film layer and the second film layer comprise the same polymer.

Embodiment 11. The laminate film structure according to any preceding or succeeding Embodiment, wherein the laminate structure does not include a metallized film layer.

Embodiment 12. The laminate film structure according to any preceding or succeeding Embodiment, wherein the first film layer has a thickness of 25 µm or less.

Embodiment 13. The laminate film structure according to any preceding or succeeding Embodiment, wherein the first film layer has a thickness of 20 µm or less.

Embodiment 14. The laminate film structure according to any preceding or succeeding Embodiment, wherein the first film layer has a thickness of 15 µm or less.

Embodiment 15. The laminate film structure according to any preceding or succeeding Embodiment, wherein the second film layer has a thickness of 25 µm or less.

Embodiment 16. The laminate film structure according to any preceding or succeeding Embodiment, wherein the second film layer has a thickness of 20 µm or less.

Embodiment 17. The laminate film structure according to any preceding or succeeding Embodiment, wherein the second film layer has a thickness of 15 µm or less.

Embodiment 18. The laminate film structure according to any preceding or succeeding Embodiment, wherein the barrier adhesive layer comprises an adhesive comprising:
an isocyanate component comprising a single species of polyisocyanate; and
an isocyanate-reactive component comprising a hydroxyl-terminated polyester incorporated as substantially-miscible solids in a carrier solvent, the polyester formed from a single species of a linear aliphatic diol having terminal hydroxyl groups and from 2 to 10 carbon atoms, and a linear dicarboxylic acid, the polyester having a number average molecular weight from 300 to 5,000 and being solid at 25° C., and having a melting point of 80° C. or below.

Embodiment 19. An article comprising the laminate film structure according to any preceding or succeeding Embodiment.

Embodiment 20. The article of preceding or succeeding Embodiment, wherein the article is a flexible package.

Embodiment 21. The article of preceding or succeeding Embodiment, wherein the article is a stand-up pouch.

Embodiment 22. A method of forming a laminate structure having a desired barrier performance, the method comprising:
determining the desired barrier performance of the laminate structure;
selecting a barrier adhesive;
selecting two or more film layers, including at least a first film layer and a second film layer;
applying the barrier adhesive on a surface of the first film layer; and
bringing a surface of the second film layer into contact with the barrier adhesive applied on the surface of the first film layer, thereby forming the laminate structure having a desired barrier performance.

Embodiment 23. The method of any preceding or succeeding Embodiment, further comprising selecting a third film layer and bringing a surface of the third film layer into contact with a surface of the first film layer or second film layer.

Embodiment 24. The method of any preceding or succeeding Embodiment, wherein the laminate film structure has a thickness less than the thickness of an existing laminate structure having comparable desired barrier performance.

Embodiment 25. The method of any preceding or succeeding Embodiment, where the desired barrier performance is an oxygen transmission rate not greater than 20 $ccO_2$/$m^2$/day, measured according to ASTM Method D3985

Embodiment 26. The method of any preceding or succeeding Embodiment, where the desired barrier performance is a water vapor transmission rate not greater than 5 $gmH_2O$/$m^2$/day, measured according to ASTM Method F1249.

That which is claimed is:

1. A laminate film structure suitable for use in a flexible packaging, comprising:
a first film layer; and
a barrier adhesive layer disposed on a surface of the film layer,
wherein the laminate film structure has an oxygen transmission rate not greater than 20 $ccO_2$/$m^2$/day, measured according to ASTM Method D3985; and wherein the barrier adhesive layer comprises an adhesive comprising an isocyanate component comprising a single species of polyisocyanate; and an isocyanate reactive component comprising a hydroxyl-terminated polyester incorporated as substantially-miscible solids in a carrier solvent, the polyester formed form a single species of a linear aliphatic diol having terminal hydroxyl groups and from 2 to 10 carbon atoms and a linear dicarboxylic acid, the polyester having a number average molecular weight from 300 to 5,000 and being solid at 25° C., and having a melting point of 80° C. or below.

2. The laminate film structure of claim 1, wherein the first film layer comprises a polymer selected from the group consisting of polyethylene, polypropylene, polyethylene terephthalate, nylon, polystyrene, and polyvinyl dichloride.

3. The laminate film structure of claim 1, further comprising a second film layer comprising a polymer selected from the group consisting of polyethylene, polypropylene, polyethylene terephthalate, nylon, polystyrene, and polyvinyl dichloride, wherein the barrier adhesive layer is disposed intermediate the film layer and the second film layer.

4. The laminate film structure of claim 1, wherein the laminate structure does not include a metallized film layer.

5. An article comprising the laminate film structure of claim 1.

* * * * *